US009681683B2

United States Patent
Esposti et al.

(10) Patent No.: US 9,681,683 B2
(45) Date of Patent: Jun. 20, 2017

(54) FEEDER DEVICE OF PRODUCTS WITH REDUCED LONGITUDINAL DIMENSIONS IN MACHINES FOR THE TOBACCO INDUSTRY

(71) Applicant: G.D S.p.A., Bologna (IT)

(72) Inventors: Marco Esposti, Casalecchio di Reno (IT); Ivan Eusepi, Castel Maggiore (IT); Nicola Baldanza, Zola Predosa (IT); Massimo Sartoni, Bologna (IT)

(73) Assignee: G.D S.p.A., Bologna (IT)

( * ) Notice: Subject to any disclaimer, the term of this patent is extended or adjusted under 35 U.S.C. 154(b) by 0 days.

(21) Appl. No.: 14/892,008

(22) PCT Filed: May 20, 2014

(86) PCT No.: PCT/IB2014/061559
§ 371 (c)(1),
(2) Date: Nov. 18, 2015

(87) PCT Pub. No.: WO2014/188338
PCT Pub. Date: Nov. 27, 2014

(65) Prior Publication Data
US 2016/0095349 A1    Apr. 7, 2016

(30) Foreign Application Priority Data
May 24, 2013   (IT) .............................. BO2013A0262

(51) Int. Cl.
*A24C 5/47*  (2006.01)
*A24C 5/32*  (2006.01)
(Continued)

(52) U.S. Cl.
CPC .............. *A24C 5/478* (2013.01); *A24C 5/327* (2013.01); *A24C 5/356* (2013.01); *B65B 19/10* (2013.01);
(Continued)

(58) Field of Classification Search
CPC .......... A24C 5/327; A24C 5/478; A24C 5/356
See application file for complete search history.

(56) References Cited

U.S. PATENT DOCUMENTS 3,039,367 A * 6/1962 Stelzer ................ A24D 3/0287
131/282
3,863,750 A * 2/1975 Giatti .................... A24C 5/478
198/438

(Continued)

FOREIGN PATENT DOCUMENTS

DE   102008047655 A1   3/2010
FR      2395896 A1   1/1979
(Continued)

OTHER PUBLICATIONS

International Search Report and Written Opinion dated Nov. 5, 2014 for related PCT Application No. PCT/IB2014/061559.

*Primary Examiner* — Thomas Randazzo
(74) *Attorney, Agent, or Firm* — Shuttleworth & Ingersoll, PLC; Timothy J. Klima

(57) ABSTRACT

A feeder device of products with reduced longitudinal dimensions in machines for the tobacco industry comprises a main feeder roller which rotates continuously and which has a plurality of active peripheral flutes acting to hold a respective product; the main roller is designed to pass the products on to respective flutes on corresponding handling rollers of a main line of feed of the products in the machine the device is associated with; the device comprises means for continuously filling the peripheral flutes of the main roller, the filling means comprising a plurality of feeding and passing-on means, in particular at least first means and second means for feeding and passing on corresponding groups of the products to corresponding groups of flutes located one after the other on the main roller.

20 Claims, 6 Drawing Sheets

(51) Int. Cl.
*A24C 5/356* (2006.01)
*B65B 19/10* (2006.01)
*B65G 47/84* (2006.01)

(52) U.S. Cl.
CPC ......... *B65G 47/846* (2013.01); *B65G 47/848* (2013.01)

(56) References Cited

U.S. PATENT DOCUMENTS

| | | | | |
|---|---|---|---|---|
| 4,079,575 A * | 3/1978 | Focke | ...................... | B65B 11/30 53/148 |
| 4,452,255 A * | 6/1984 | Brand | ...................... | A24C 5/327 131/282 |
| 4,825,994 A * | 5/1989 | Gomann | ................. | A24C 5/327 131/282 |
| 5,232,079 A * | 8/1993 | Belcastro | ................. | A24C 5/34 198/370.11 |
| 6,808,059 B2 * | 10/2004 | Nagai | ..................... | A24C 5/327 131/907 |
| 7,922,638 B2 * | 4/2011 | Draghetti | ............... | A24C 5/326 493/39 |
| 2007/0144541 A1 * | 6/2007 | Draghetti | ............... | A24C 5/327 131/56 |

FOREIGN PATENT DOCUMENTS

| | | | | |
|---|---|---|---|---|
| GB | 1376567 A | * | 2/1972 | ............. A24C 5/478 |
| GB | 1376567 A | * | 12/1974 | ............. A24C 5/478 |
| WO | WO0048908 A1 | | 8/2000 | |
| WO | WO2006097796 A2 | | 9/2006 | |

* cited by examiner

FEEDER DEVICE OF PRODUCTS WITH REDUCED LONGITUDINAL DIMENSIONS IN MACHINES FOR THE TOBACCO INDUSTRY

This application is the National Phase of International Application PCT/IB2014/061559 filed May 20, 2014 which designated the U.S. and that International Application was published under PCT Article 21(2) in English.

This application claims priority to Italian Patent Application No. BO2013A000262 filed May 24, 2013, which application is incorporated by reference herein.

TECHNICAL FIELD

This invention relates to a feeder device of products with reduced longitudinal dimensions in machines for the tobacco industry.

BACKGROUND ART

By way of example only, the term "products with reduced longitudinal dimensions" is used to mean pieces of filter material, such as cylinders of activated carbon, cellulose acetate, paper and the like and even pieces of tubes of plastic or plasticized material and including also small spherical products, such as beads which may, for example, constitute additives for flavouring cigarette tobacco or the filters themselves.

These products with reduced longitudinal dimensions are referred to by experts in the trade as "non-cuttables", that is, products which cannot be cut in the machine.

The above listed basic products are fed to cigarette manufacturing or making machines and, more specifically, to machines for making composite filters, that is, filters obtained by juxtaposing two or more pieces or plugs of filter having different filtering properties and which, when finished, have longitudinal dimensions which are relatively much longer than the individual basic products themselves.

In state-of-the-art tobacco industry machines, which work at very high speeds, these basic products are obtained from elongate elements or rods which are cut during the process cycle in the machines themselves until reaching the reduced longitudinal dimensions the basic products are required to have.

In order to clarify the dimensions involved, it should be considered, purely as an example, without limiting the invention, that these basic products have transversal dimensions ranging from 5 to 8 mm and longitudinal dimensions from 6 to 9 mm, whilst the longitudinal dimensions of the elongate elements or rods are 6 to 15 times those of the basic products.

The relatively large longitudinal dimensions of the rods allow easy handling in a particularly precise and stable manner and also at speeds which are not excessively high.

Since the products with reduced longitudinal dimensions need to be supplied to the manufacturing machines after they have been cut to their final reduced longitudinal dimensions, they give rise to major problems of handling and stability during feeding to the manufacturing machines, and these are added to the need to attain feed speeds which are impossible for hitherto known devices.

DISCLOSURE OF THE INVENTION

This invention has for an aim to overcome one or more of the above mentioned disadvantages.

The above aims are substantially achieved by a feeder device of products with reduced longitudinal dimensions in machines for the tobacco industry, as set out in the present description.

BRIEF DESCRIPTION OF THE DRAWINGS

Further features and advantages of the invention are more apparent in the non-limiting description below, with reference to a preferred but non-exclusive embodiment of a feeder device of products with reduced longitudinal dimensions in machines for the tobacco industry, as illustrated in the accompanying drawings, in which.

DETAILED DESCRIPTION OF PREFERRED EMBODIMENTS OF THE INVENTION

Figure 1:
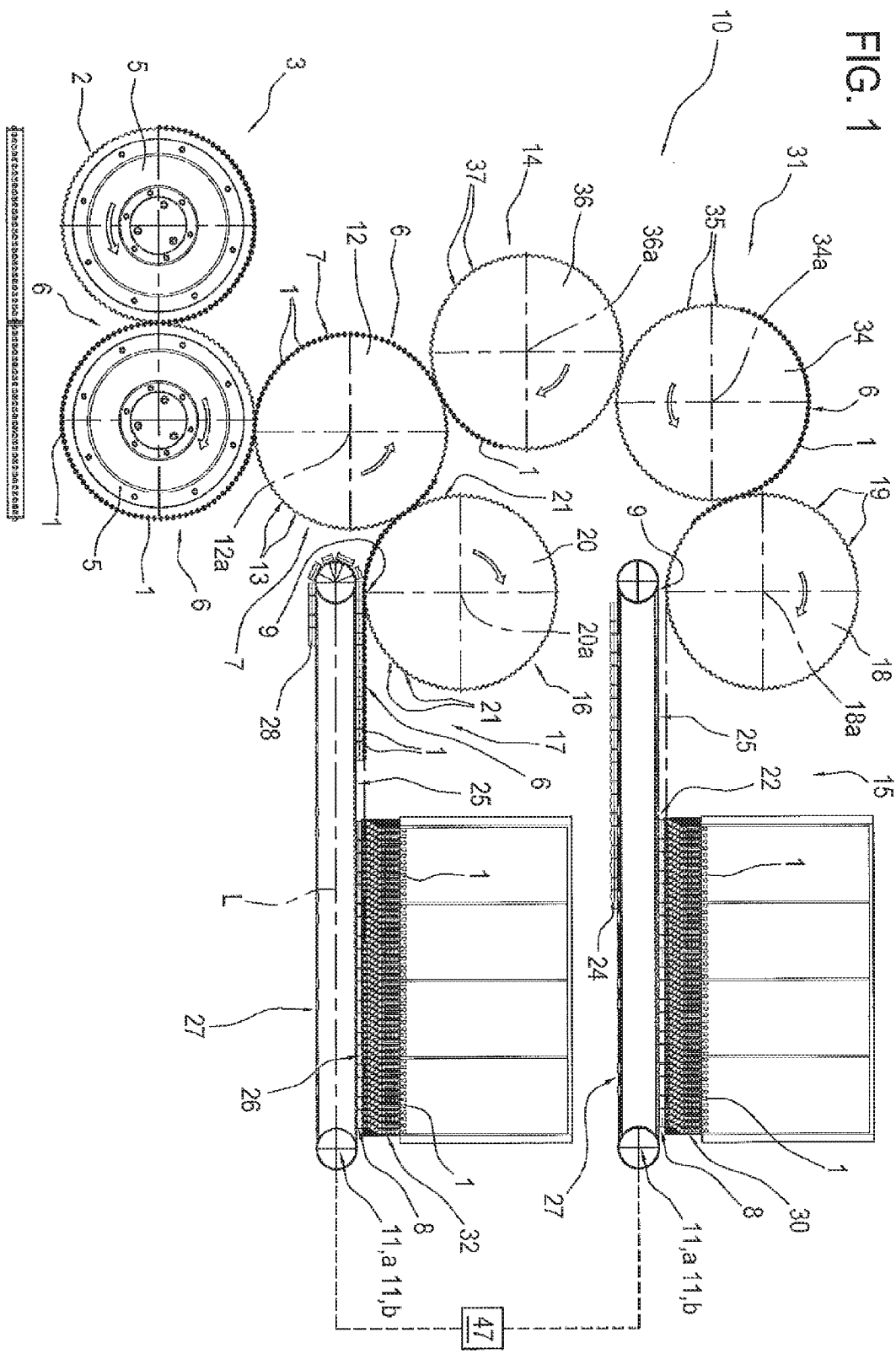
FIG. 1 is a schematic front view of the feeder device according to the invention.

The reference numeral 10 denotes a feeder device of products 1 with reduced longitudinal dimensions in machines for the tobacco industry.

The term "products 1 with reduced longitudinal dimensions" is used to mean preferably plugs of filter material, and more specifically, cylinders of activated carbon.

By way of example, the products 1 might also be plugs of cellulose acetate, paper and the like and even pieces of tubes of plastic or plasticized material and including also small spherical products, such as beads which may, for example, constitute additives for flavouring cigarette tobacco or the filters themselves.

The device 10 comprises a main feeder roller 12 which rotates continuously and which has a plurality of active peripheral flutes 13 acting to hold a respective product 1.

The flutes 13 of the main feeder roller 12 act by suction.

The main feeder roller 12 rotates about its axis of rotation 12a. More specifically, in the embodiment illustrated, the main feeder roller 12 rotates anticlockwise.

The main feeder roller 12 is designed to pass the products 1 on to respective flutes 2 on corresponding handling rollers 5 of a main line 3 of feed of the products 1 in the machine the device 10 is associated with.

The main line 3 comprises a series of rollers 5 which are mounted in sequence with each other and which feed the products 1 towards one or more processing stations. More specifically, they are fed towards a station for making composite filters to be eventually assembled in cigarettes or smokable articles.

The device 10 comprises means 14, 16 for filling the peripheral flutes 13 of the main roller 12.

The filling means 14, 16 comprise a plurality of feeding and passing-on means 15, 17 for feeding and passing on corresponding groups 6 of the products 1 to corresponding groups 7 of flutes 13 of the main roller 12 located one after the other.

More specifically, the groups 7 of flutes 13 of the main roller 12 comprise a number of flutes 13 equal to the number of products 1 defining the group 6 of products 1.

More specifically, the feeding and passing-on means 15, 17, which have continuous motion, comprise at least first feeding and passing-on means 15 and second feeding and passing-on means 17.

Preferably, the first and second feeding and passing-on means 15 and 17 are located at different heights, one above the other.

The first and the second feeding and passing-on means 15 and 17 feed respective groups 6 of products 1 to the main roller 12.

The means 15, 17 for feeding and passing on the corresponding groups 6 of the products 1 comprise respective primary rollers 18, 20, which are rotatable continuously and which have respective active peripheral flutes 19, 21 acting to hold the respective group 6 of products 1.

The active peripheral flutes 19, 21 of the primary rollers 18, 20 act to hold the products by suction.

Each primary roller 18, 20 rotates about a respective axis of rotation 18a and 20a and is located upstream of the main roller 12.

More specifically, in the embodiment illustrated, the primary rollers 18, 20 of the first and second feeding and passing-on means 15 and 17 rotate continuously clockwise.

The flutes 19, 21 of the primary rollers 18, 20 are located along an angular stretch of the respective primary roller 18, 20, the angular stretch being preferably a submultiple of the total angular size of the primary roller 18, 20 itself, and in particular is half the angular size of the primary roller 18, 20.

In other words, on each primary roller 18, 20, the number of active flutes 19, 21 extending along an angular stretch equal to a submultiple of the total angular size of each primary roller 18, 20 is equal to the number of products 1 in the group 6. The other flutes 19, 21, extending along the remaining angular stretch, do not act to hold the products 1.

Taking this concept to the limit, in an embodiment not illustrated, the primary rollers 18 and 20 each have a number of active flutes 19, 21 which is equal to the number of products 1 in the group 6 and which extend along an angular stretch equal to a submultiple of the total angular size of each primary roller 18, 20 and the rest of the peripheral surface of each primary roller 18, 20 has no flutes 19, 21 on it.

It should be noted that the primary rollers 18, 20 are the same in diameter as the main feeder roller 12.

In the preferred embodiment illustrated, the angular stretch of the primary rollers 18, 20, along which the respective active flutes 19, 21 extend is equal to half the angular size of the respective primary roller 18, 20.

In effect, since the peripheral flutes 13 of a single main feeder roller 12 have to be fed and filled by a pair of filling means 14, 16, each of the filling means 14, 16 supplies a respective group 6 of products 1 corresponding to half the total angular size of the main feeder roller 12.

Consequently, each primary roller 18, 20 of the respective filling means 14, 16 feeds a group 6 of products 1 corresponding to half the total angular size of the main feeder roller 12. Since the main feeder roller 12 is the same size as the primary rollers 18 and 20, half the total angular size of the main feeder roller 12 is equal to half the total angular size of each primary roller 18, 20.

In short, on the primary rollers 18 and 20, each angular stretch along which the respective active flutes 19, 21 extend as a sub-multiple of the total angular size of the respective primary roller 18, 20 is a function of the number of filling means 14, 16 used to fill the main feeder roller 12.

Preferably, the main feeder roller 12 has ninety-six peripheral flutes 13.

Consequently, and preferably, the primary rollers 18 and 20 each have forty-eight active flutes 19 and 21 acting to hold the products 1, located in sequence with each other along respective angular stretches equal to half the total angular size of the selfsame primary rollers 18 and 20.

Each primary roller 18, 20 continuously receives the respective group 6 of products 1 from corresponding means 22, 24; 26, 28 for transferring the group 6 of products 1 withdrawn from corresponding means 30, 32 for housing and releasing the selfsame products 1.

More specifically, each of the transfer means of the first and second feeding and passing-on means 15, 17 comprises a plurality of carriers, in particular a first and a second carrier 22, 24 and 26, 28, movable in sequence between the corresponding means 30, 32 for housing and releasing the products 1 and the respective primary feeding and passing-on roller 18, 20.

In the embodiment illustrated, each of the transfer means of the first and second feeding means 15, 17 comprises, in particular, a respective pair of carriers 22, 24 and 26, 28.

Each carrier 22, 24 and 26, 28 receives the group 6 of products 1 in a loading station 8 at the respective housing and releasing means 30, 32 and moves until it reaches the peripheral speed of the primary roller 18, 20 at a station 9 for passing on the products 1 to the flutes 19, 21 of the selfsame primary roller 18, 20.

More precisely, each carrier 22, 24 and 26, 28 feeds to the respective primary roller 18, 20 groups 6 of products 1 equal in number to the number of active flutes 19 and 21.

For each carrier 22, 24 and 26, 28, the number of flutes 4 for housing and retaining the products 1 is equal to the number of products 1 defining the group 6 of products 1 and corresponding to a sub-multiple of the peripheral flutes 13 of the main feeder roller 12 for feeding the products 1.

More precisely, in this preferred embodiment, each carrier 22, 24 and 26, 28 has forty-eight housing and retaining flutes 4.

Thus, each carrier 22, 24 and 26, 28 feeds to the respective primary roller 18 and 20 a respective group 6 of products 2.

At the loading station 8, the housing and releasing means 30, 32 release onto each carrier 22, 24 and 26, 28 the products 1 which are then transferred by the carriers 22, 24 and 26, 28 to the respective primary roller 18, 20 at the passing-on station 9.

It should be noted that in this embodiment, the primary roller 18, 20, at each rotation thereof, is fed alternately by one or the other of the two carriers 22, 24 and 26, 28 of the respective first and second feeding and passing-on means 15, 17 defining the respective pair of carriers 22, 24 and 26, 28.

In effect, once one respective carrier 22, 24 and 26, 28 has passed on the respective products 1 to the respective primary roller 18, 20, that carrier 22, 24 and 26, 28 returns to the housing and releasing means 30, 32, thus clearing the passing-on station 9 for the other carrier 22, 24 and 26, 28 of the respective pair.

Each time the carriers 22, 24 and 26, 28 leave the loading station 8 and return to the selfsame loading station 8, they make a movement which is, as a whole, a closed loop.

The closed-loop movement is a substantially circulatory movement.

The trajectory of the respective carriers 22, 24 and 26, 28 is thus a closed-loop trajectory or path having an upper section 25 and a lower section 27 joined to each other by respective curved stretches, in particular semi-circular stretches.

More specifically, the upper section 25 and the lower section 27 of the trajectory, or path, extend in a straight line in a direction parallel to a longitudinal axis L of feed.

At the loading station 8, the products 1 are placed in the respective flutes 4 of the transfer carrier 22, 24 and 26, 28 by a movement transversal to the feed trajectory of the selfsame carrier 22, 24; 26, 28. More specifically, the movement is transversal to the longitudinal axis L of feed.

Advantageously, each carrier 22, 24; 26, 28 comprises means 23 for stopping the movement and positioning of the product 1 being placed in the respective flute 4 at the loading station 8.

More specifically, the means 23 for stopping the movement and positioning are in the form of a wall at the lateral outside end of the flute 4, opposite the end where the product 1 is placed in the respective flute 4.

The carriers 22, 24; 26,28 of each of the feeding and passing-on means 15, 17 are driven independently of each other by respective drive means 11a, 11b.

More precisely, the drive means 11a, 11b are in the form of motion transmission belts looped around at least one driven roller and one drive roller driven by its own independent motor.

More specifically, each carrier 22, 24; 26, 28 of the respective pair is moved by a respective transmission belt 11a, 11b driven by an independent motor of its own.

A control unit 47 is connected to the drive means 11a, 11b of the respective feeding and passing-on means 15, 17 to coordinate with each other not only the drive movement of each carrier of the respective pair but also the mutual drive movement of the pairs of carriers 22, 24; 26, 28, in order to feed the primary rollers 18 and 20 continuously and to thereby guarantee filling of the main roller 12.

This allows feeding the primary rollers 18, 20 at each rotation of the primary roller 18, 20 itself.

Considering the first and the second feeding and passing-on means 15 and 17, the respective carriers 22, 24; 26, 28, and more specifically, each pair of carriers 22, 24; 26, 28 of the respective first and second feeding and passing-on means 15 and 17, are driven independently so that the active flutes 19, 21 holding the products 1 on the respective primary roller 18, 20 are fed at each rotation of the primary roller 18, 20 itself.

In other words, the carriers 22, 24; 26, 28 of the respective first and second feeding and passing-on means 15 and 17 feed the active flutes 19, 21 of the respective primary roller 18, 20 in sequence, one after the other.

More specifically, one of the carriers 22, 24; 26, 28 of the respective pair is stationary at the loading station 8, when the other carrier 22, 24; 26, 28 is in motion, in particular, is moving through the passing-on station 9.

More specifically, one of the carriers 22, 24; 26, 28 of the respective pair is stationary at the loading station 8, when the other carrier 22, 24; 26, 28 is in motion, in particular, is moving at the passing-on station 9 to load the respective primary roller 18, 20, as is the case with the second feeding and passing-on means 17 illustrated in FIG. 1, or is already moving away from the passing-on station 9, as is the case with the first feeding and passing-on means 15 illustrated in FIG. 1.

In other words, if one carrier 22, 24; 26, 28 of one pair occupies the upper section 25 of the closed-loop trajectory, the other carrier 22, 24; 26, 28 at least partly occupies the lower section 27 of the closed-loop trajectory.

It should be noted that to guarantee feeding of the primary roller 18, 20, the carrier 22, 24; 26, 28 stationary at the loading station 8 starts moving and accelerates in the direction of the passing-on station 9.

In order to reach the passing-on station 9, the carrier 22, 24; 26, 28 may reach a speed greater than the peripheral speed of the primary roller 18, 20.

To transfer the products 1 from each carrier 22, 24; 26, 28 to each primary roller 18, 20, the carrier 22, 24; 26, 28 in the passing-on station 9 moves at a speed identical to the peripheral speed of the primary roller 18, 20.

Advantageously, from the passing-on station 9 to the loading station 8, each carrier 22, 24; 26, 28 accelerates as it moves towards the loading station 8 and then slows down and stops on reaching it so that the products 1 are loaded when the carrier is stationary.

The drive means 11a, 11b of the corresponding carrier 22, 24; 26, 28 thus allow each carrier 22, 24; 26, 28 of a respective pair to move independently from the loading station 8 to the passing-on station 9 and vice versa, varying the speed and acceleration thereof as a function of the position of the carrier 22, 24; 26, 28 along its trajectory.

Each of the carriers 22, 24; 26, 28 of the respective first and second feeding and passing-on means 15 and 17 moves along a common longitudinal axis L of feed.

Advantageously, the respective drive means 11a, 11b of the corresponding carrier 22, 24; 26, 28 are located on opposite sides of the longitudinal axis L.

A suction chamber 29 in communication with the flutes 4 of the carriers 22 is provided at the upper section 25 of the trajectory of the carriers 22, 24; 26, 28 to hold the products 1 in the respective flutes 4 during their transfer from the loading station 8 to the passing-on station 9.

More specifically, the suction chamber 29 is located along an active transfer stretch of the carriers 22, 24; 26, 28, extending at least from the loading station 8 to the passing-on station 9.

In this embodiment, the active transfer stretch is the upper section 25.

The suction chamber 29 extends mainly along the longitudinal axis L of feed of the carriers 22, 24; 26, 28.

This allows each carrier 22, 24; 26, 28 to accelerate more at the lower section 27 of the trajectory after unloading the products in the passing-on station 9, to considerably reduce the down time of the carriers 22, 24; 26, 28 after they have released their load of products 1.

Advantageously, between the respective primary roller 18 and the main roller 12 advancing means 31 are provided to make the group 6 of products 1 advance.

In effect, in the preferred embodiment, while the primary roller 20 of the second feeding and passing-on means 17 is substantially tangent to the main feeder roller 12, thus transferring the group 6 of products 1 directly to the main feeder roller 12 itself, between the latter and the primary roller 18 of the first feeding and passing-on means 15 there is a pair of advancing rollers 34, 36.

The advancing means 31 comprise a first and a second advancing roller 34 and 36 having respective active peripheral flutes 35 and 37 acting to hold the products 1 and situated at respective angular stretches of the respective first and second advancing rollers 34, 36.

More specifically, the first advancing roller 34 is substantially tangent to the primary roller 18 of the first feeding means 15, and the second advancing roller 36 is interposed between, and substantially tangent to, the first advancing roller 34 and the main feeder roller 12.

The first and second advancing rollers 34, 36 rotate about respective axes of rotation 34a, 36a in clockwise and anticlockwise direction, respectively.

Advantageously, the angular stretches along which the active peripheral flutes 35 and 37 acting to hold the products 1 on the first and second advancing rollers 34, 36 are a sub-multiple of the total angular size of the main roller 12, preferably half of the total angular size.

Since the first and second advancing rollers 34, 36 are the same size as the main roller 12 and the primary roller 18, there are forty-eight active peripheral flutes 35 and 37 acting to hold the products 1.

In an embodiment not illustrated, there are means for arranging the products received from the main roller 12 in two parallel rows, where the individual products 1 of the two rows are aligned with each other transversely to the direction of feed.

Figure 2:
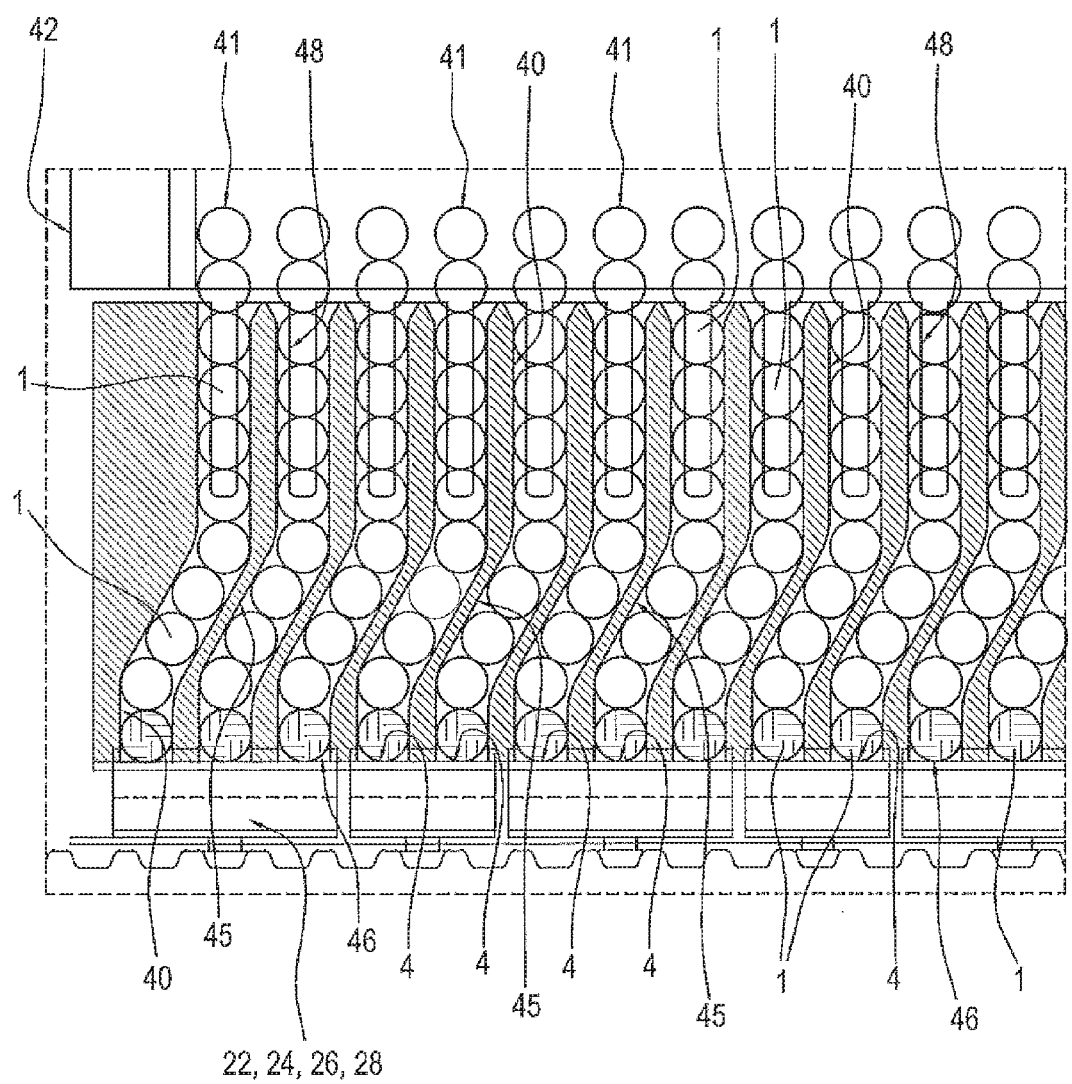
FIG. 2 is a scaled-up front view of a detail showing the feeding and passing-on means of the device of FIG. 1.
Figure 3:
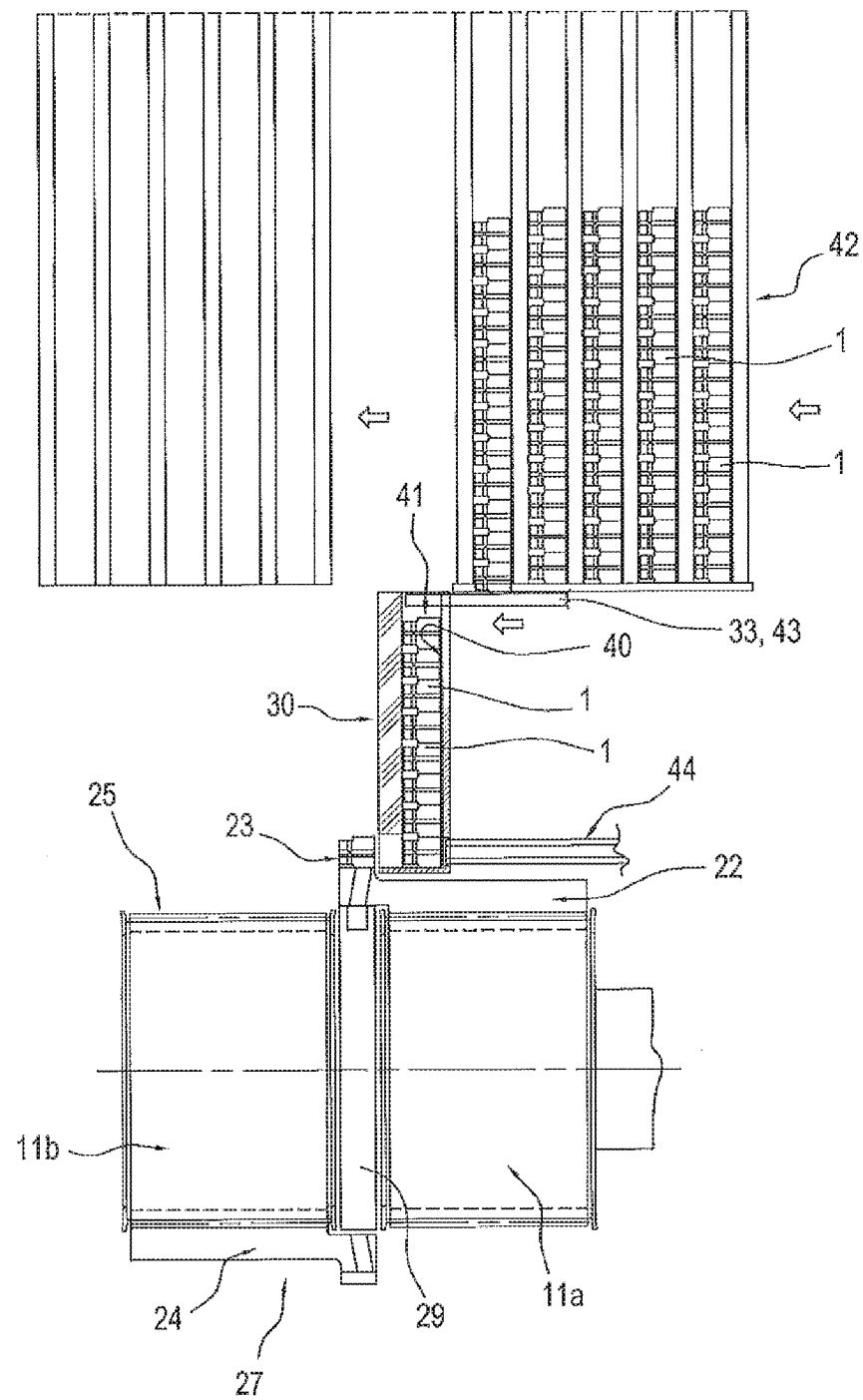
FIGS. 3, 4, 5 and 6 are schematic side views showing a detail of the feeder device of FIG. 1 in a sequence of operating steps.
Figure 4:
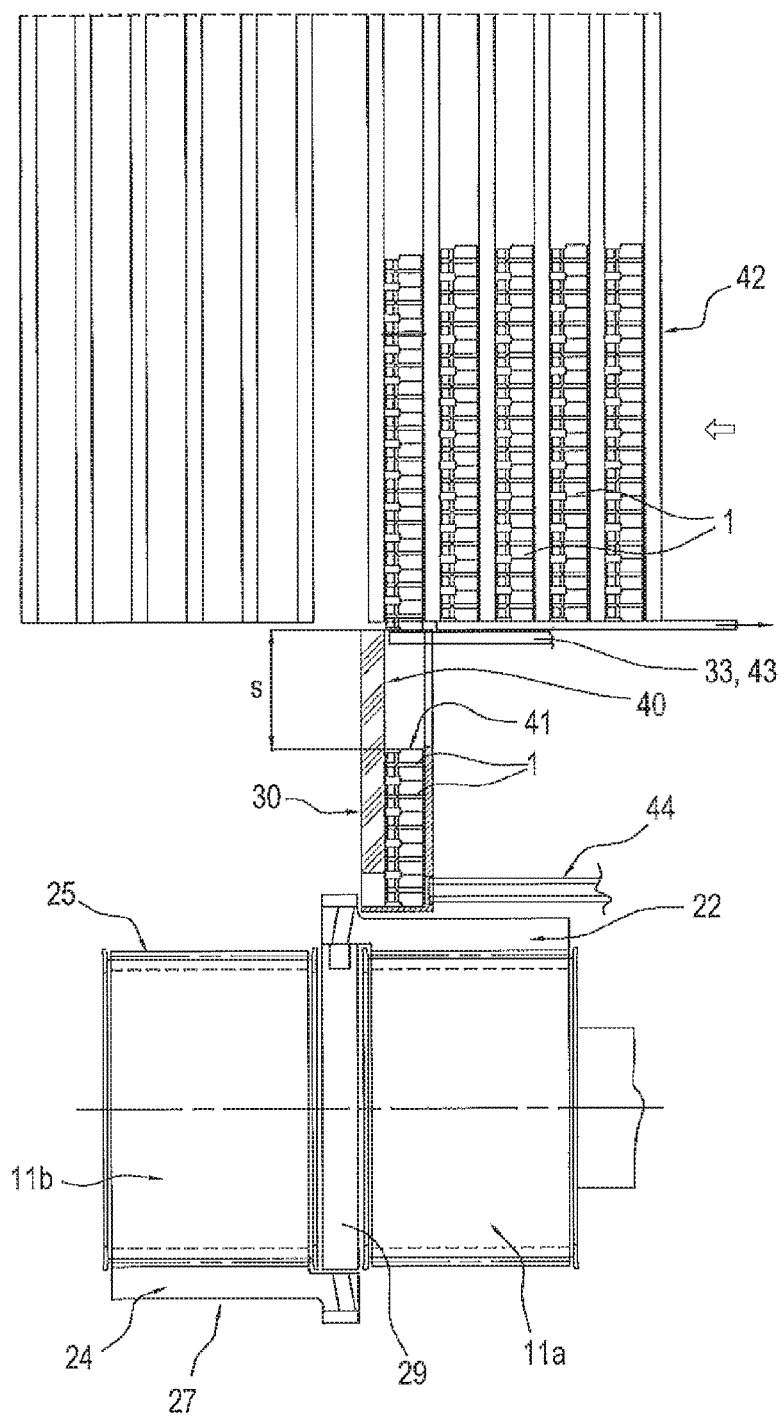
Figure 5:
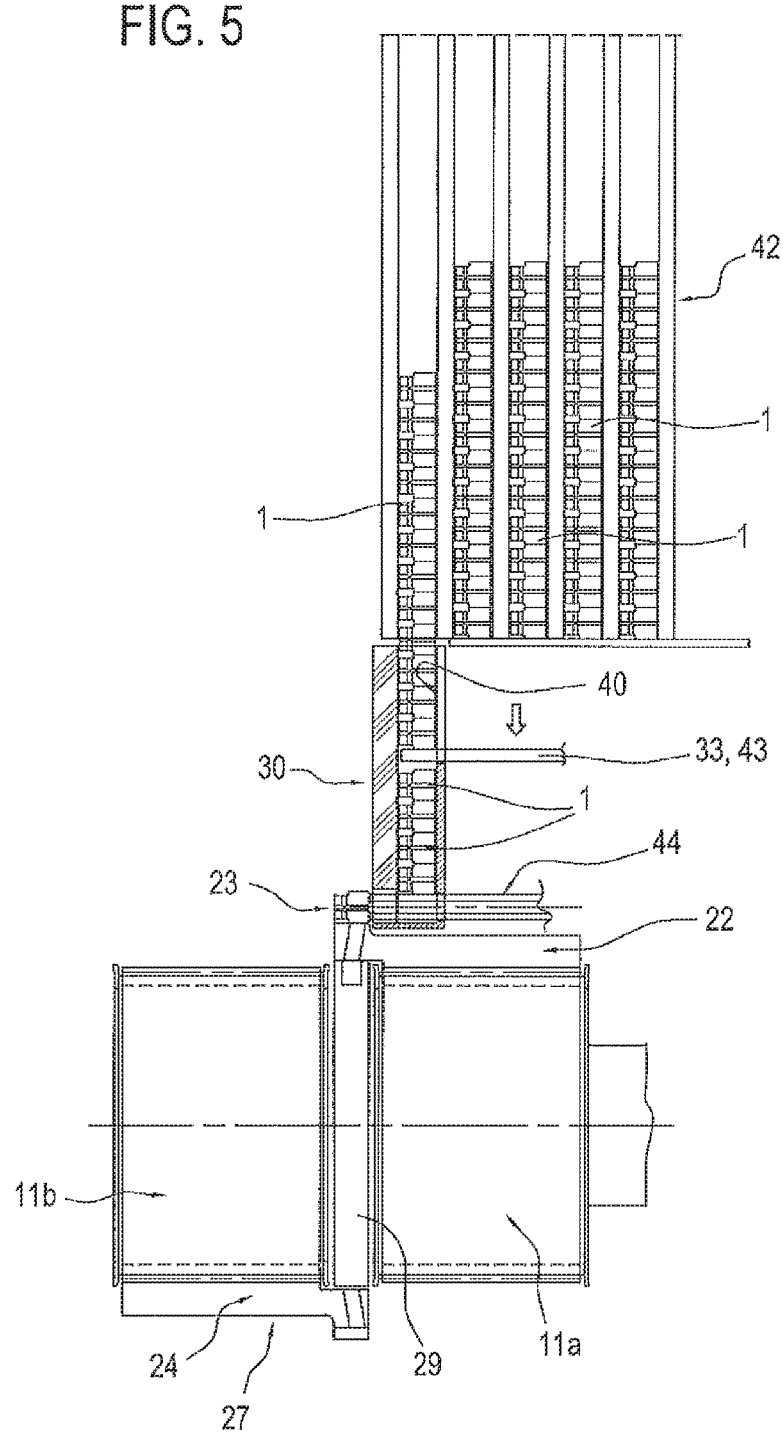
Figure 6:
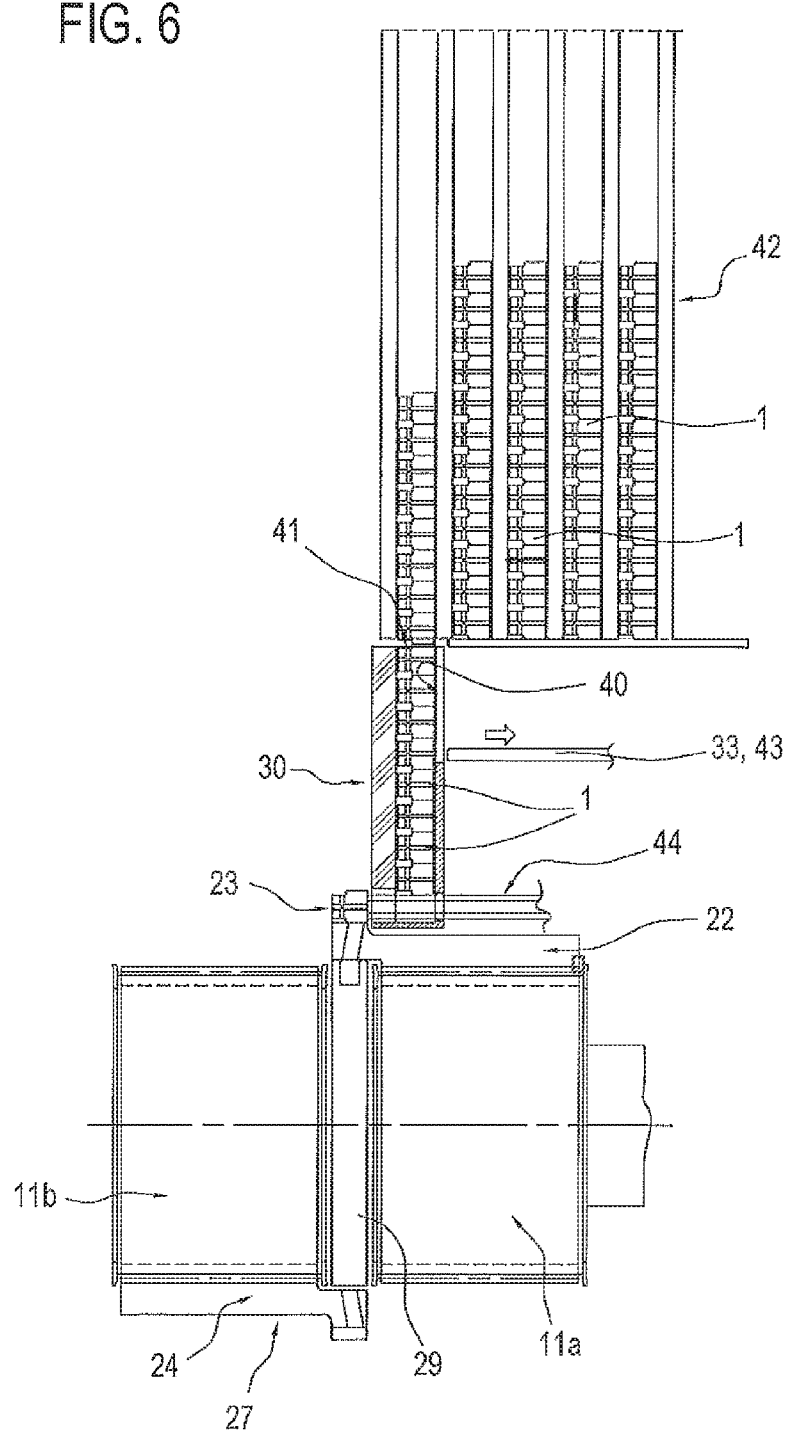

Advantageously, the housing and releasing means 30, 32 of the first and second feeding and passing-on means 15, 17 comprise a plurality of channels 40 for conveying corresponding rows 41 of products 1 towards a respective bottom outlet end 46 for the products 1, as illustrated in FIG. 2. The plurality of channels 40 corresponds to the number of products 1 in each group 6 of products 1.

When a carrier 22, 24; 26, 28 is stationary at the loading station 8, each bottom outlet end 46 of the respective channel 40 faces a respective housing and retaining flute 4 of the carrier 22, 24; 26, 28.

In this preferred embodiment, each of the housing and releasing means 30, 32 has forty-eight conveying channels 40.

Advantageously, the conveying channels 40 have at least one intermediate inclined stretch 45 designed to prevent excessive compression on the products 1 which are near the respective bottom outlet ends 46 of the channels 40.

Preferably, the intermediate inclined stretch 45 is made in the proximity of the respective bottom outlet end 46 of the channels 40.

Each channel 40 is fed by a respective row 41 of products using trays 42 for storing the products 1.

Advantageously, when a row 41 of products 1 from a new tray 42 for storing the products 1 is fed into the respective channel 40, there are means 33 or accompanying the selfsame products 1 into the respective conveying channels 40 resting on the products 1 previously fed into the selfsame channels 40, as shown in FIGS. 3 to 6.

In effect, during the passage from the tray previously emptied to the new tray 42, the conveying channels 40 are gradually emptied of products 1, which means that inside each channel 40 a gap "S" is created which the first products 1 leaving the new tray 42 have to fill.

If the first products 1 leaving the new tray 42 were free to drop down the gap "S" there would be a risk of the products accidentally jamming or tipping over and thus obstructing the respective conveying channel 40.

Advantageously, the accompanying means 33 guarantee that the first products 1 leaving the new tray 42 remain arranged in the correct position as they move down the respective channel 40.

Advantageously, the means 33 for accompanying the products 1 in the conveying channels 40 comprise a respective element 43 for supporting the new row 41 of products 1 and which is movable from a raised position for receiving the new row 41 of products 1 and a lowered position for releasing the row 41 of products 1 onto the preceding products 1.

Once it has accompanied the respective row 41 leaving the old tray 42, the supporting element 43 returns to the starting position in order to accompany a new row 41 of products 1 leaving the next tray.

More specifically, each channel 40 has a slot 48 in which the supporting element 43 moves as it accompanies the respective row 41 down the channel 40.

In order to feed the flutes 4 of the carriers 22, 24, 26, 28, there are, at the bottom outlet end 46 of the channels 40, means 44 for placing the products 1 in the respective flutes 4 and being preferably in the form of a respective pusher.

The term pusher is used here to denote a mechanical element or, alternatively, a pneumatic element.

The device 10 according to the invention thus allows overcoming the above mentioned disadvantages, in particular by improving the way products with reduced longitudinal dimensions are handled.

More specifically, the device 10 allows considerably increasing the speed of feeding products with reduced longitudinal dimension, known as "non-cuttables", to tobacco industry machines in which the device 10 is installed.

The invention claimed is:

1. A feeder device of plugs of filter material with reduced longitudinal dimensions in a machine for the tobacco industry, comprising:
a main feeder roller having a plurality of main feeder roller active peripheral flutes each acting to hold a respective one of the plugs, the main feeder roller configured to pass the plugs on to respective flutes on corresponding handling rollers of a main line of feed of the plugs in the machine;
a filling device for filling the main feeder roller active peripheral flutes, the filling device comprising:
first and second primary rollers,
a first feeding and passing on device and a second feeding and passing on device for feeding and passing on respective groups of the plugs to the respective first and second primary rollers, which rotate continuously and which have respective primary roller active peripheral flutes acting to hold the respective groups of the plugs, and from the respective primary roller active peripheral flutes to corresponding groups of main feeder roller active peripheral flutes;
first and second housing and releasing devices for housing and releasing the respective groups of the plugs;
the first and second feeding and passing on devices including, respectively, first and second transferring devices for transferring the respective groups of the plugs withdrawn from corresponding first and second housing and releasing devices;
each of the first and second primary rollers continuously receiving the respective groups of the plugs from the corresponding first and second transferring device,
each of the first and second transferring devices comprising a first carrier and a second carrier, movable in sequence between the respective first and second housing and releasing device and the respective first and second primary roller; the groups of main feeder roller active peripheral flutes being located one after the other.

2. The device according to claim 1, wherein, for each of the first and second primary rollers, the primary roller active peripheral flutes are located along an angular stretch of the primary roller, the angular stretch being a submultiple of a total angular size of the respective first and second primary roller.

3. The device according to claim 1, wherein each of the first and second carriers returns to the respective first and second housing and releasing device by a movement which is a closed loop.

4. The device according to claim 1, and further comprising first and second drives for independently driving the first and second feeding and passing on devices, respectively.

5. The device according to claim 1, wherein each of the first and second carriers of the respective first and second feeding and passing on devices moves along a common longitudinal axis of feed; the respective first and second drives being located on opposite sides of the longitudinal axis.

6. The device according to claim 1, wherein at the first and second housing and releasing devices, the plugs are placed in respective flutes of the respective first and second carrier by a movement transversal to a trajectory of feed of the respective first and second carrier.

7. The device according to claim 1, wherein each first and second carrier includes a stopping device for stopping a movement and positioning of a respective one of the plugs placed in a respective flute, the stopping device including a wall at a lateral outside end opposite an end where the respective one of the plugs is placed in the respective flute.

8. The device according to claim 1, wherein each carrier has a number of flutes corresponding to a submultiple of a number of main feeder roller active peripheral flutes.

9. The device according to claim 1, wherein the first and second carriers of each of the first and second feeding and passing on devices feed the primary roller active peripheral flutes of the respective first and second primary rollers one after another.

10. The device according to claim 1, and further comprising, between one of the first and second primary rollers and the main feeder roller, which has continuous motion, an advancing device for advancing the groups of plugs, the advancing device comprising a first advancing roller and a second advancing roller having respective active peripheral flutes acting to hold the plugs and situated at respective angular stretches of the respective first and second advancing rollers, the angular stretches being a submultiple of a total angular size of the main feeder roller.

11. The device according to claim 1, comprising an arranging device for arranging the plugs received from the main feeder roller in two parallel rows, where individual products of the two parallel rows are aligned with each other transversely to a direction of feed.

12. The device according to claim 1, wherein for each of the first and second primary rollers, the primary roller active peripheral flutes are located along an angular stretch of the primary roller, the angular stretch being half an angular size of the respective first and second primary roller.

13. The device according to claim 1, wherein each of the first and second carriers receives the group of plugs in a loading station at the respective first and second housing and releasing device and moves until the each of the first and second carriers reaches a peripheral speed of the respective first and second primary roller at a passing on station for passing on the plugs to the respective primary roller active peripheral flutes.

14. The device according to claim 13, and further comprising, at an active transfer stretch of the first and second carriers, extending from the loading station to the passing on station, a suction chamber which is in communication with the flutes of the carriers during movement on the active transfer stretch for transferring the plugs, the suction chamber being aligned with a longitudinal axis of feed of the first and second carriers.

15. The device according to claim 13, wherein one of the first and second carriers of the respective first and second feeding and passing on devices is stationary at the loading station, when the other of the first and second carriers is in motion.

16. The device according to claim 1, wherein the first and second feeding and passing on devices each comprise a plurality of conveying channels for conveying corresponding rows of plugs towards a respective bottom outlet end for the plugs; the plurality of conveying channels corresponding to a number of plugs in each group of plugs.

17. The device according to claim 16, and further comprising accompanying devices for accompanying the plugs into the respective conveying channels resting on the plugs previously fed into the channels when a new row of plugs from a new tray for storing the plugs is fed into the respective conveying channels.

18. The device according to claim 17, wherein the accompanying devices each comprise a respective supporting element for supporting the new row of plugs and which is movable from a raised position for receiving the new row of plugs and a lowered position for releasing the new row of plugs onto the preceding plugs; the supporting element returning to the raised position in order to accompany the next row of plugs.

19. The device according to claim 18, and further comprising, at the respective bottom outlet ends, pusher devices for pushing the plugs into the respective flutes of the carriers.

20. The device according to claim 19, wherein the respective conveying channels include intermediate inclined stretch for preventing excessive compression on the plugs which are near outlets of the conveying channels.

* * * * *